Feb. 10, 1970 V. A. NILES 3,495,071
PRESSURE COOKING APPARATUS
Filed Feb. 24, 1969 2 Sheets-Sheet 1

VERGIL A. NILES
INVENTOR.

BY
Robert K. Rhea
AGENT

Feb. 10, 1970 V. A. NILES 3,495,071
PRESSURE COOKING APPARATUS
Filed Feb. 24, 1969
2 Sheets-Sheet 2
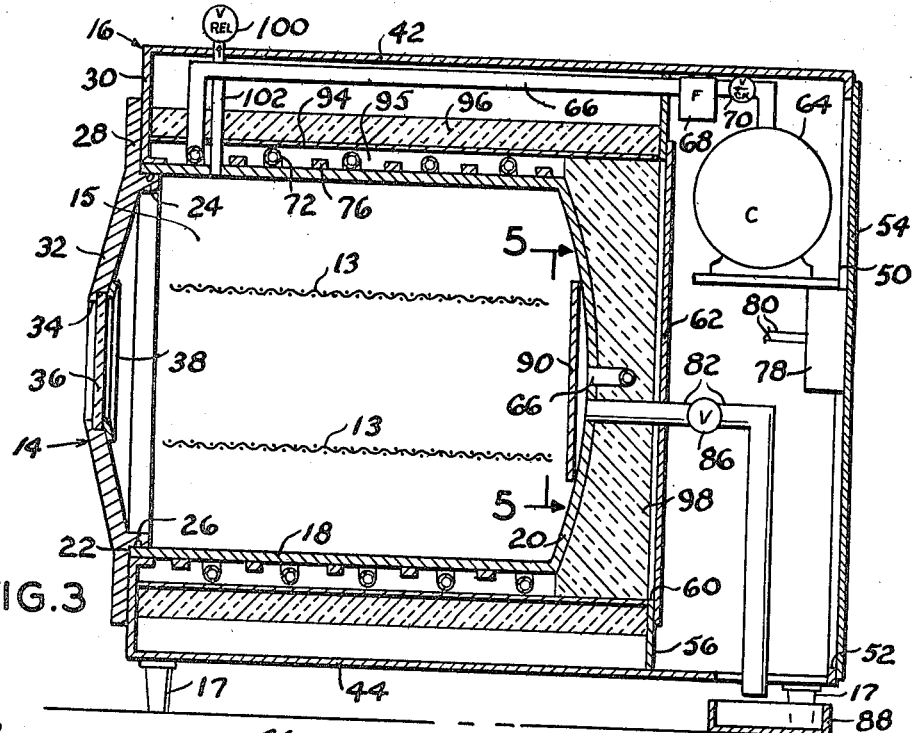
FIG. 3
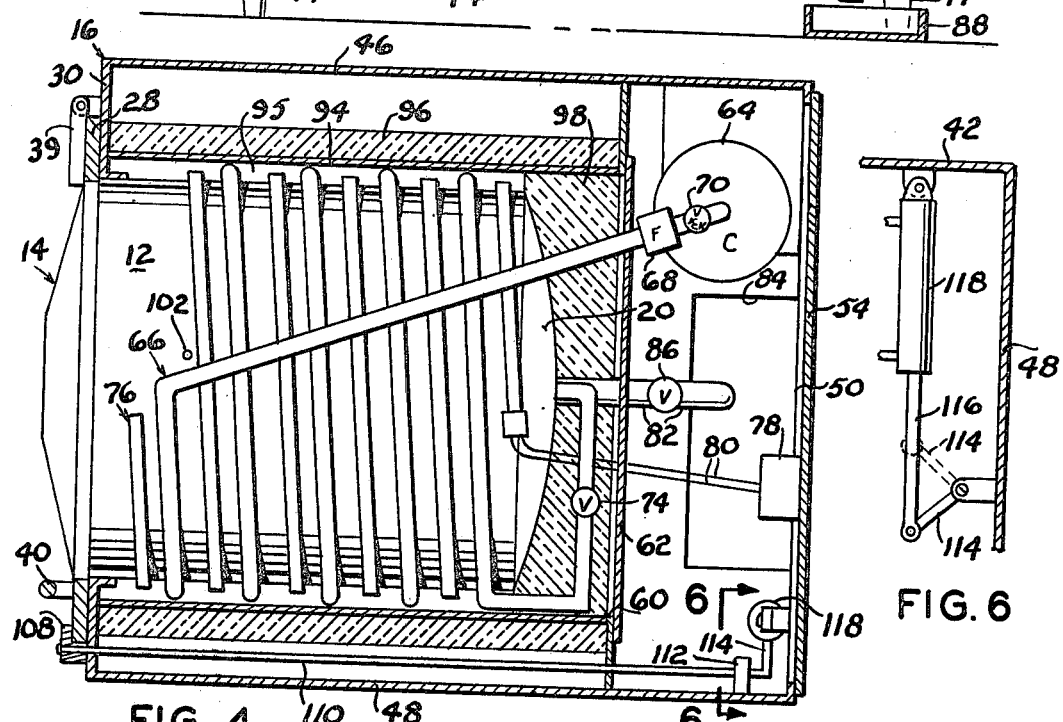
FIG. 4
FIG. 6
VERGIL A. NILES
INVENTOR.
BY
Robert K. Rhea
AGENT

United States Patent Office 3,495,071
Patented Feb. 10, 1970

3,495,071
PRESSURE COOKING APPARATUS
Vergil A. Niles, 403½ Main, Yukon, Okla. 73099
Filed Feb. 24, 1969, Ser. No. 801,692
Int. Cl. F27d 11/00; A21b 1/00, 1/22
U.S. Cl. 219—401                              4 Claims

ABSTRACT OF THE DISCLOSURE

A pressure cooking apparatus having a sealed oven and a length of tubing connected, at one end, with an spirally wound around the periphery of the oven and forming a hot air pressure chamber. A motor driven compressor is connected with the other end of the tubing for applying air to the pressure chamber and an elongated electrical heater is wound around the periphery of said oven between the convolutions of the tubing.

CROSS REFERENCES TO RELATED APPLICATION

The present application is related to an application filed by me in the United States Patent Office on Feb. 27, 1967, under Ser. No. 618,967, now Patent No. 3,428,-783, for Pressure Cooking Apparatus.

BACKGROUND OF THE INVENTION

Field of the invention

The present invention relates to pressure broilers and more particularly to an apparatus and method of broiler cooking by means of heated air under pressure.

There are many types of broilers in use which depend upon various sources of heat such as electric, gas, charcoal, coal or infrared rays. These broilers depend, for their operation on the transmission of heat through the air of the container to the surface of the food to be broiled. In many instances this results in prolonged broiling time and a nonuniform broiling of the food stuff which is sometimes a result of improper operation of the broiler or inattention of the operator.

This invention eliminates the above disadvantages by providing an apparatus for fast and uniform cooking resulting in cooked food stuffs having a palatable flavor. This invention also provides means for quickly heating and serving prepared and frozen meals supplied from a deep freeze unit as well as providing means for quickly defrosting frozen foods. The invention is not limited to its cooking features but may be used for drying articles or sterilizing utensils by the movement of hot air.

Description of the prior art

The Austin Patent No. 2,339,794 uses compressed air subjected to radiant heat for cooking food in an oven but he further relies on subjecting his food to a source of radiant heat to complete the cooking process.

The Thomas Patent No. 1,732,289 discloses cooking foods by the heat of compressed air which is directed toward the food after impinging on the curved walls of an oven. This patent relies on a fuel burner for heating the air within its conveyor tube prior to entering the oven and thus uses substantially as much or more fuel for the cooking process than in conventional gas fired ovens.

The Triplett Patent No. 1,768,172 discloses cooking food in an oven by applying heat to the exterior thereof and injecting preheated air under pressure into the container wherein the preheated air forms a vapor ventilating stream for removing gases cooked out of the food.

The Macchi et al. Patent No. 3,169,871 discloses cooking foods by jets of hot air impinged on the food or the containers therefor. This patent, like the Thomas patent, requires a supply of fuel for heating the air to the desired temperature and thus is not as economical in operation as a conventional gas fired oven.

SUMMARY OF THE INVENTION

This invention is an improvement over the above referred to prior patents and my above mentioned pending application by providing a sealed oven connected with a compressed air chamber formed by a length of tubing spirally wound around the periphery of the oven with a heating element similarly spirally wound around the oven periphery in interdigitated relation with respect to the coils of the heating chamber. The heating element thus maintains a desired temperature within the oven chamber by conduction through its wall and convection of the air therein while simultaneously preheating air in the compressed air chamber by convection and conduction. Control means injects preheated air into the oven under a selected pressure to initiate the cooking action which is continued by the heating element. Other control means interrupts the cooking action by exhausting the oven and releasing door locking means at a predetermined time.

The principal object is to provide an apparatus for quickly cooking foods by preheated air under pressure in a temperature controlled oven.

BRIEF DESCRIPTION OF THE DRAWINGS

FIGURE 3 is a vertical cross-sectional view taken substantially along the line 3—3 of FIG. 1;

FIGURE 4 is a horizontal cross-sectional view, partially in elevation, taken substantially along the line 4—4 of FIG. 1;

FIGURE 6 is a fragmentary elevational view, partially in section, looking in the direction of the arrows 6—6 of FIG. 4.

DESCRIPTION OF THE PREFERRED EMBODIMENT

Figure 2:
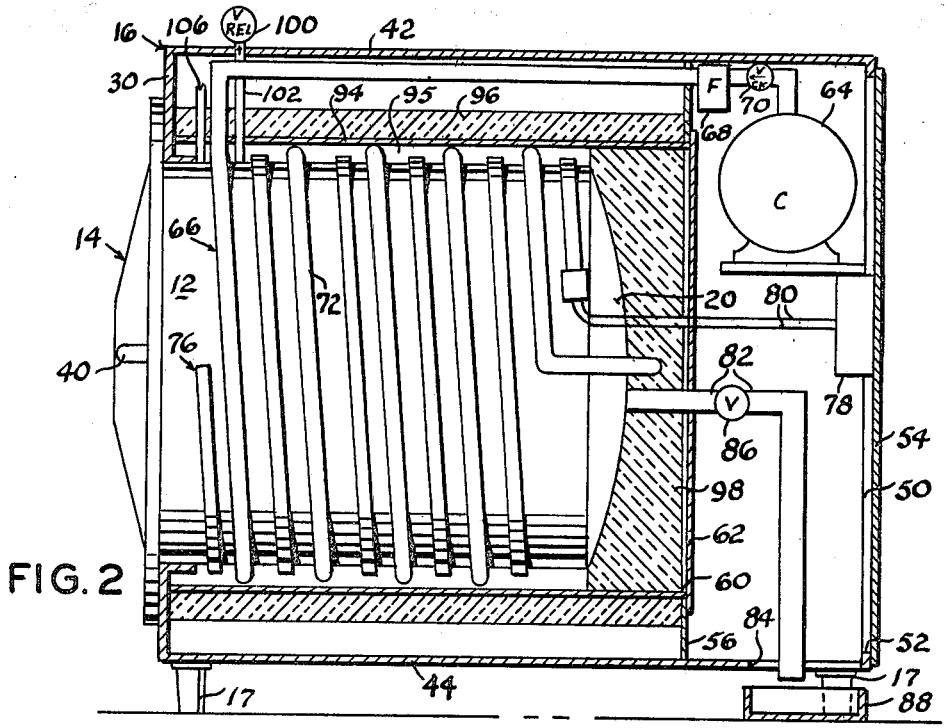
FIGURE 2 is a vertical cross-sectional view, partially in elevation, taken substantially along the line 2—2 of FIG. 1.

Like characters of reference designate like parts in those figures of the drawings in which they occur.

In the drawings:

The reference numeral 10 indicates the apparatus, as a whole, which is rectangular in general configuration comprising an oven 12 having removable food supporting wire racks 13 and closed by a door 14 and supported within an outer jacket or housing 16 in turn supported by adjustable legs 17. The oven 12 is generally cylindrical having a wall 18, a closed end or back wall 20 and an open end 22 closed by the door 14 thus forming a cooking chamber 15. The door 14 is characterized by an inwardly directed annular flange 24 cooperatively received by the inner periphery of the open end of the oven and seals therewith by a resilient member, such as an O-ring 26. The oven door further includes an annular flange 28 contiguously contacting a forward wall 30 of the jacket 16 in overlapping relation. The central portion of the door 14 is bulged or tapers outwardly, as at 32, and is centrally apertured, as at 34, to provide an inspection opening closed by glass 36 secured in place by a ring 38. The door 14 is connected to the forward jacket wall 30 by hinges 39 while a handle 40, opposite the hinges, permits opening the door in a horizontal swinging action, as hereinafter explained.

The jacket 16 is substantially greater in overall dimensions than the oven 12 and is characterized by upper and lower horizontal walls 42 and 44, respectively, which are connected with and extend rearwardly of the front wall 30 in combination with side walls 46 and 48. The top, bottom and side walls are joined to a back wall 50 having an opening 52 closed by an inspection plate 54. A partition wall 56 extends between and is secured to the top, bottom and side walls of the jacket 16, intermediate the spacing between the oven rear wall 20 and jacket back wall 50, to form a control unit chamber 58 between the partition wall 56 and the back wall 50. The partition wall 56 is provided with an opening 60 diametrically greater than the oven 12 and closed by an access door 62 for the purposes presently explained.

A motor driven compressor 64 is mounted in the chamber 58. A length of tubing 66 is connected, at one end, with the output of the compressor through a moisture removing filter 68 and a check valve 70. The tubing 66 extends through the jacket and is spirally wound around the periphery of the oven with each convolution, indicated at 72, arranged in spaced-apart relation longitudinally of the oven. The other end portion of the tubing 66 is secured to a suitable opening formed in the oven rear wall 20 through a control valve 74. The tubing 66 thus forms a chamber containing compressed air which is heated in the manner presently explained.

The cross sectional area of the tubing 66 is not critical but should be dimensioned so that the volume of air contained thereby will be sufficient when injected into the oven, as hereinafter explained, to achieve the derired cooking pressure for the particular class of foods being cooked.

An elongated electrical resistance heating elment, such as a Calrod 76, is spirally wound around the periphery of the oven 12 between the tubing convolution 72 in contiguous contact with the oven wall 18. The Calrod is connected with a junction box 78 in turn connected with a source of electrical energy, not shown, by wires 80. A thermostat and control 77 for the heating element is preferably mounted on the housing wall 30.

An exhaust or vent pipe 82 is connected with the oven chamber 15 through its rear wall 20 with its free end extending through an opening 84 formed in the jacket bottom wall 44. An exhaust control valve 86 is interposed in the vent 82. A grease catching drip pan 88 is positioned below the exhaust opening 84.

A baffle plate 90 (FIGS. 3 and 5) is secured at its respective corners as by welding, indicated at 92, to the inner surface of the oven rear wall 20 and shields the open end of the respective tubes 66 and 82. The purpose of the baffle 90 is to divert the stream of hot air from direct contact with food stuffs on the racks 13 in the oven.

A cylindrical shell 94, formed of heat reflective material, surrounds the oven 12 outwardly of the convolutions of the tubing 66 and heating element 76 and extends between the jacket front wall 30 and partition wall 56. The purpose of the shell 94, spaced outwardly of the limit of the coiled tubing and heat element, is to permit these members to be removed rearwardly of the oven through the inspection plate opening 60 for servicing or repair without disassembly of the entire device. The shell 94 thus forms an air chamber 95 surrounding the oven which induces conservation of energy by heating air within the tubing 66 while heating the oven 12. A layer of heat insulating material 96 surrounds the shell 94. Other heat insulating material 98 is interposed between the outer surface of the oven rear wall 20 and the inspection plate 62.

A pressure release or pop-off valve 100 is connected with the oven chamber 15 by a tube 102. A temperature gage 104 is mounted on the jacket forward wall 30 and connected with the oven chamber 15 by a tube 106. Similarly a pressure gage 107 is mounted on the front wall 30. An "off-on" control switch 109 is also mounted on the wall 30.

Figures 1, 5:
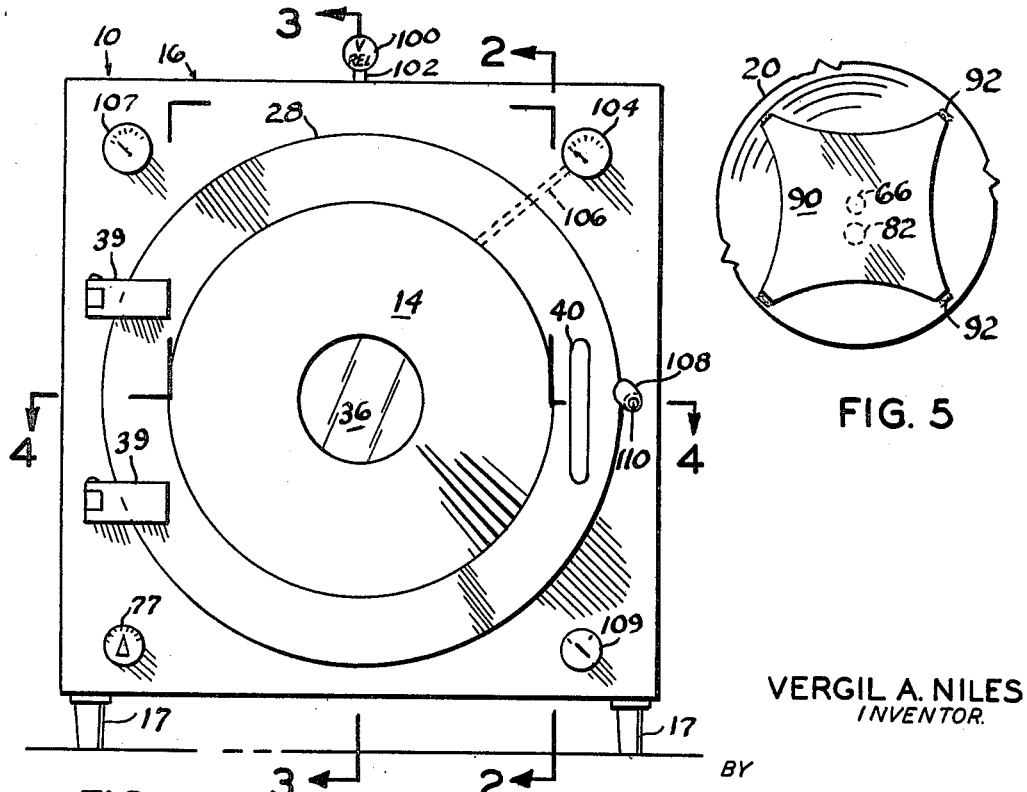
FIGURE 1 is a front elevational view of the device in door closed position.
FIGURE 5 is a fragmentary elevational view looking in the direction of the arrows 5—5 of FIG. 3.

As shown more clearly in FIGS. 1, 4 and 6, the oven door 14 is locked and released by a cam 108 mounted on one end of a rod 110 extending horizontally through the jacket front wall 30 and supported, adjacent the rear wall 50, by a bracket 112 where a laterally extending arm portion 114 of the rod is connected with the piston 116 of an air cylinder 118 pivotally connected with the jacket top wall 42. The air cylinder 118 is connected with a source of air under pressure, such as the compressor 64 or an air reservoir, by flexible tubing, neither of which are shown. When the air cylinder 118 is actuated to extend its piston 116, the cam 108 is rotated into locking position over a peripheral portion of the door flange 28 so that the door cannot be opened. When the air cylinder piston 116 is retracted, the cam support rod 110 is rotated in an opposite direction about its longitudnal axis to rotate the cam away from the door flange 28 to release the door.

OPERATION

Conventional controls are used for operating the cooking apparatus, for example, a pressure responsive switch maintains a desired air pressure in the tubing 66 which shuts off the compressor at a predetermined air pressure. The valves 74 and 86 may be magnetic valves operated in response to a time control or a manually operated switch. During normal operation assume that the tubing 66 is filled with air under a selected pressure, for example, 20 p.s.i., and that the heating element 76 has been activated a sufficient length of time to heat the oven and air in the tubing 66. Food stuffs, not shown, are then placed within the oven chamber 15 and the door closed and locked by the cam in response to actuation of the air cylinder 118. The control valve 74 is opened to admit hot air into the oven to a desired pressure and conventional time controls, connected with the valves 74, 86, and air cylinder 118, not shown, are manually set for the desired cooking time. Any increase in air pressure within the oven chamber 15, beyond a selected pressure, for the particular food stuffs, is automatically exhausted by the pressure relief valve 100. When the desired cooking time has elapsed the inlet valve 74 is closed and the exhaust valve 86 is opened by the time controls which exhausts the oven through the vent 82. When the pressure within the oven chamber 15 is decreased to or near atmospheric pressure the air cylinder 118 is operated to retract its piston 116 which releases the door locking cam 108 so that the door may be manually opened and the food stuffs removed. Obviously, another air cylinder, or the like, may be utilized for automatically opening the door 14, if desired.

The following are examples of a series of tests of cooking food stuffs while using this apparatus wherein the oven chamber was preheated to the indicated temperature and hot air under approximately 20 p.s.i. pressure was injected into the oven chamber to initiate the cooking action:

| Food and quantity | Oven temperature, ° F. | Cooking time, minutes |
|---|---|---|
| Beef roast, 2 lbs | 260 | 30 |
| Do | 300 | 26 |
| Baking potatoes, medium, about 3 per lb. when raw | 260 | 30 |
| Do | 400 | 20 |
| Frying chicken pieces, 2 lb. legs, thighs and breasts | 260 | 17 |
| Do | 350 | 10 |
| Whole frying chicken, 2½ lb., cut up | 375 | 7 |
| Dry pinto beans, 4 cups, covered with water | 300 | 26 |
| Frozen T.V. dinners, beef, ham and meat loaf | 300 | 15 |

All the cooked foods had excellent color, eye appeal and palatability. The chicken was well browned. In the case of the beef roast and chicken cooked at the higher temperature some additional shrinkage resulted, indicating that the lower temperature and resultant longer cooking time was most economical.

Obviously the invention is susceptible to changes or alterations without defeating its practicability, therefore, I do not wish to be confined to the preferred embodiment shown in the drawings and described herein.

I claim:
1. A pressure cooking apparatus, comprising:
   a housing having a vertical front wall provided with an opening;
   a cylindrical inner metal wall within said housing, said inner wall defining an oven having one closed end and an opposite open end coinciding with the opening in said housing;
   a metal door hermetically sealing the oven, said door being hingedly connected with the front wall of said housing for movement in a horizontal plane toward and away from the openings in said housing and said oven;
   cam means locking said door when in closed position;
   means forming a pressure chamber surrounding said oven within said housing and communicating with said oven through its closed end;
   heat insulating material surrounding said oven and said pressure chamber within said housing;
   an air compressor connected with the pressure chamber and supplying air thereto under superatmospheric pressure;
   heating means comprising an electrical resistance heating element extending around the periphery of said oven for heating the latter and the air in the pressure chamber and electrically insulated therefrom; and,
   means controlling the superatmospheric pressure and temperature of hot air within said oven and said pressure chamber.

2. Structure as specified in claim 1 in which the means forming a pressure chamber comprises:
   a length of tubing connected at one end with said air compressor and connected at its other end with the closed end of said oven, said tubing being wound around the periphery of said oven inwardly of said insulating material, and in which said control means includes:
   a valve interposed in said tubing adjacent its connection with the closed end of said oven.

3. Structure as specified in claim 2 in which said door is characterized by:
   an annular flange coaxially entering and sealing with the inner wall surface of the open end portion of said oven;
   a peripheral flange overflapping a portion of the outer surface of said front wall, said door having a central opening; and a glass closing the opening of said door.

4. Structure as specified in claim 3 in which said cam means includes:
   an elongated rod journalled by said housing and projecting, at one end, through said front wall adjacent said door;
   a cam secured to said one end of said rod, a portion of said cam overlapping a peripheral portion of said peripheral door flange when said cam is in one position;
   a lever on the other end of said rod; and,
   a pressure cylinder supported by said housing, said pressure cylinder having a piston rod connected with a free end portion of said level for rotating the latter and rotating said cam into and out of door locked position.

References Cited

UNITED STATES PATENTS

| 1,422,348 | 7/1922 | Duncan | 219—401 |
| 2,339,974 | 1/1944 | Austin | 99—1 |
| 2,885,294 | 5/1959 | Larson et al. | 99—216 |
| 2,899,534 | 8/1959 | Sjölund | 126—369 X |
| 3,069,994 | 12/1962 | Levis | 126—369 X |
| 3,169,871 | 2/1965 | Macchi et al. | 99—1 |

VOLODYMYR Y. MAYEWSKY, Primary Examiner

U.S. Cl. X.R.

99—216; 126—369; 219—399